US010230489B2

(12) United States Patent
Tang et al.

(10) Patent No.: US 10,230,489 B2
(45) Date of Patent: Mar. 12, 2019

(54) ADAPTIVE MODULATION AND CODING METHOD AND APPARATUS

(71) Applicant: Huawei Technologies Co., Ltd., Shenzhen (CN)

(72) Inventors: Zhihua Tang, Shanghai (CN); Chunying Gu, Shanghai (CN); Wei Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/498,187

(22) Filed: Apr. 26, 2017

(65) Prior Publication Data

US 2017/0230137 A1    Aug. 10, 2017

Related U.S. Application Data

(63) Continuation of application No. PCT/CN2014/089592, filed on Oct. 27, 2014.

(51) Int. Cl.
*H04L 1/00* (2006.01)
*H04B 7/06* (2006.01)
(Continued)

(52) U.S. Cl.
CPC .......... *H04L 1/0003* (2013.01); *H04B 7/0632* (2013.01); *H04B 17/318* (2015.01);
(Continued)

(58) Field of Classification Search
CPC combination set(s) only.
See application file for complete search history.

(56) References Cited

U.S. PATENT DOCUMENTS

| 9,319,928 B2* | 4/2016 | Bertrand | H04W 28/0236 |
| 2012/0236806 A1* | 9/2012 | Doppler | H04W 28/16 |
| | | | 370/329 |

(Continued)

FOREIGN PATENT DOCUMENTS

| CN | 101711058 A | 5/2010 |
| CN | 101895994 A | 11/2010 |

(Continued)

OTHER PUBLICATIONS

"Performance evaluation of Rel-10 feedback extensions," 3GPP TSG RAN WG1 Meeting #61, Montreal, Canada, R1-103282, 3rd Generation Partnership Project, Valbonne, France (May 10-14, 2010).

*Primary Examiner* — Faruk Hamza
*Assistant Examiner* — Abusayeed M Haque
(74) *Attorney, Agent, or Firm* — Leydig, Voit & Mayer, Ltd.

(57) ABSTRACT

Embodiments of the present invention provide an adaptive modulation and coding method and an apparatus, which relate to the communications field and can improve accuracy of MCS selection, thereby improving a system throughput rate. The method includes: acquiring scheduling information of first user equipment in a first cell; acquiring scheduling information of second user equipment in a second cell; acquiring a SINR predictor of the first user equipment according to the scheduling information of the first user equipment in the first cell and the scheduling information of the second user equipment in the second cell; obtaining a SINR adjustment value of the first user equipment according to the SINR predictor and a SINR adjustment amount; and determining, according to a correspondence between a SINR and a modulation and coding scheme MCS, an MCS cor-
(Continued)

responding to the SINR adjustment value of the first user equipment.

14 Claims, 4 Drawing Sheets

(51) Int. Cl.
*H04B 17/318* (2015.01)
*H04B 17/336* (2015.01)
*H04W 72/04* (2009.01)
*H04B 17/373* (2015.01)
*H04W 72/12* (2009.01)
*H04W 88/08* (2009.01)
*H04B 7/024* (2017.01)
*H04B 7/0452* (2017.01)

(52) U.S. Cl.
CPC ......... *H04B 17/336* (2015.01); *H04B 17/373* (2015.01); *H04L 1/0009* (2013.01); *H04W 72/0473* (2013.01); *H04W 72/1231* (2013.01); *H04W 72/1268* (2013.01); *H04W 72/1273* (2013.01); *H04B 7/024* (2013.01); *H04B 7/0452* (2013.01); *H04W 88/08* (2013.01)

(56) References Cited

U.S. PATENT DOCUMENTS

| | | | | |
|---|---|---|---|---|
| 2013/0114434 | A1* | 5/2013 | Muruganathan | H04W 16/14 370/252 |
| 2013/0121186 | A1 | 5/2013 | Vajapeyam et al. | |
| 2013/0242761 | A1* | 9/2013 | Park | H04B 7/0452 370/252 |
| 2014/0140289 | A1 | 5/2014 | Moulsley | |
| 2015/0085683 | A1* | 3/2015 | Sadek | H04W 16/14 370/252 |
| 2015/0296387 | A1 | 10/2015 | Li et al. | |
| 2015/0358982 | A1 | 12/2015 | Jeon et al. | |
| 2016/0036618 | A1* | 2/2016 | Einhaus | H04L 1/0003 370/329 |
| 2017/0222773 | A1* | 8/2017 | Sen | H04W 72/1231 |

FOREIGN PATENT DOCUMENTS

| | | |
|---|---|---|
| CN | 102036393 A | 4/2011 |
| CN | 103475450 A | 12/2013 |
| CN | 103718635 A | 4/2014 |
| CN | 103731923 A | 4/2014 |
| EP | 2515599 A1 | 10/2012 |
| EP | 2958389 A1 | 12/2015 |
| JP | 2014155092 A | 8/2014 |
| KR | 20140090351 | 7/2014 |
| WO | 2012130313 A1 | 10/2012 |
| WO | 2014101072 A1 | 7/2014 |
| WO | 2014109549 A1 | 7/2014 |
| WO | WO 2014175793 A1 | 10/2014 |

* cited by examiner

ADAPTIVE MODULATION AND CODING METHOD AND APPARATUS

CROSS-REFERENCE TO RELATED APPLICATIONS

This application is a continuation of International Patent Application No. PCT/CN2014/089592, filed on Oct. 27, 2014, the disclosure of which is hereby incorporated by reference in its entirety.

TECHNICAL FIELD

Embodiments of the present invention relate to the communications field, and in particular, to an adaptive modulation and coding method and an apparatus.

BACKGROUND

An adaptive modulation and coding (AMC) technology is an adaptive technology by using which a modulation and coding scheme (MCS) is adaptively selected according to a radio channel state to improve a throughput rate of the wireless communications system on the premise that reliability of a wireless communications system is ensured.

A Long Term Evolution (LTE) system is used as an example. In the prior art, after receiving a reference signal sent by user equipment (UE), for example, a sounding reference signal (SRS) or a demodulation reference signal (DMRS), an evolved NodeB (eNB) measures an uplink signal to interference plus noise ratio (SINR) according to the reference signal, and performs smooth filtering on the SINR to obtain an uplink SINR smooth filtering value. When scheduling the UE, the evolved NodeB uses the uplink SINR smooth filtering value as a SINR predictor for performing actual data transmission by the UE after several transmission time intervals (TTI), corrects the SINR predictor by using a SINR adjustment amount so as to obtain a SINR measurement value, and acquires, according to the SINR measurement value and a correspondence between the uplink SINR and an uplink MCS, an output MCS that needs to be used.

However, due to discontinuity of UE services, data transmission for the UE is discontinuous in a time domain and frequently changes in a frequency domain. As a result, interference from a neighboring cell in the UE changes dramatically, and has is no time-domain correlation.

Therefore, a SINR in a data transmission subframe after several TTIs relative to a current TTI cannot be accurately predicted according to only a SINR measurement value at a historical moment. A problem that a system throughput rate decreases due to inaccurate MCS selection exists in the prior art.

SUMMARY

Embodiments of the present invention provide an adaptive modulation and coding method and an apparatus, which can improve accuracy of MCS selection and further improve a system throughput rate.

To achieve the foregoing objective, the following technical solutions are used in the embodiments of the present invention:

According to a first aspect, an adaptive modulation and coding method is provided, including:

acquiring scheduling information of first user equipment in a first cell, where the scheduling information includes a resource block and transmit power that are allocated to the first user equipment;

acquiring scheduling information of second user equipment in a second cell, where the scheduling information includes a resource block and transmit power that are allocated to the second user equipment;

acquiring a signal to interference plus noise ratio SINR predictor of the first user equipment according to the scheduling information of the first user equipment in the first cell and the scheduling information of the second user equipment in the second cell;

obtaining a SINR adjustment value of the first user equipment according to the SINR predictor and a SINR adjustment amount; and determining, according to a correspondence between a SINR and a modulation and coding scheme MCS, an MCS corresponding to the SINR adjustment value of the first user equipment.

With reference to the first aspect, in a first implementable manner, when the first user equipment needs to perform uplink data transmission, the acquiring a signal to interference plus noise ratio SINR predictor of the first user equipment according to the scheduling information of the first user equipment in the first cell and the scheduling information of the second user equipment in the second cell includes:

if the resource block used by the second user equipment is the same as the resource block used by the first user equipment, acquiring, on the resource block, measurement information from the first user equipment to the first cell and interference prediction information of the first user equipment; and calculating the SINR predictor according to the measurement information from the first user equipment to the first cell and the interference prediction information of the first user equipment.

With reference to the first possible implementable manner, in a second possible implementable manner, the calculating the SINR predictor according to the measurement information from the first user equipment to the first cell and the interference prediction information of the first user equipment includes:

calculating the SINR predictor according to channel information from the first user equipment to the first cell, the transmit power of the first user equipment, channel information from the second user equipment to the first cell, the transmit power of the second user equipment, and an estimation on interference noise of a cell other than the first cell and the second cell against the first user equipment, where the channel information includes a channel response estimation.

With reference to the first possible implementable manner, in a third possible implementable manner, the calculating the SINR predictor according to the measurement information from the first user equipment to the first cell and the interference prediction information of the first user equipment includes:

correcting a historical SINR measurement value of the first user equipment according to channel information from the first user equipment to the first cell, the transmit power of the first user equipment, channel information from the second user equipment to the first cell, the transmit power of the second user equipment, and an estimation on interference noise of a cell other than the first cell and the second cell against the first user equipment, so as to calculate the SINR predictor, where the channel information includes reference signal received power and/or reference signal received quality.

With reference to the second possible implementable manner or the third possible implementable manner, in a fourth possible implementable manner, the first user equipment is coordinated multipoint CoMP user equipment but not multi-user multiple-input multiple-output MU-MIMO user equipment; or the first user equipment is MU-MIMO user equipment but not CoMP user equipment; or the first user equipment is both CoMP user equipment and MU-MIMO user equipment; or the first user equipment is neither CoMP user equipment nor MU-MIMO user equipment.

With reference to the first aspect, in a fifth possible implementable manner, when the first user equipment needs to perform downlink data transmission, the acquiring a signal to interference plus noise ratio SINR predictor of the first user equipment according to the scheduling information of the first user equipment in the first cell and the scheduling information of the second user equipment in the second cell includes:

if a resource block used by the second cell is the same as a resource block used by the first cell, acquiring, on the resource block, measurement information from the first cell to the first user equipment and interference prediction information of the first user equipment, where the first cell is a cell in which a base station sends information to the first user equipment; and calculating the SINR predictor according to the measurement information from the first cell to the first user equipment and the interference prediction information of the first user equipment.

With reference to the fifth possible implementable manner, in a sixth possible implementable manner, the calculating the SINR predictor according to the measurement information from the first cell to the first user equipment and the interference prediction information of the first user equipment includes:

correcting a historical SINR measurement value of the first user equipment according to channel information from the first cell to the first user equipment, transmit power that is of the first cell and is for the first user equipment, a channel quality indicator reported by the first user equipment, channel information from the second cell to the first user equipment, transmit power of the second cell on the resource block, and an estimation on interference noise of a cell other than the first cell and the second cell against the first user equipment, so as to calculate the SINR predictor, where the channel information includes reference signal received power and/or reference signal received quality.

According to a second aspect, a base station is provided, including:

an acquiring unit, configured to acquire scheduling information of first user equipment in a first cell, where the scheduling information includes a resource block and transmit power that are allocated to the first user equipment, where the acquiring unit is further configured to acquire scheduling information of second user equipment in a second cell, where the scheduling information includes a resource block and transmit power that are allocated to the second user equipment; and a processing unit, configured to acquire a signal to interference plus noise ratio SINR predictor of the first user equipment according to the scheduling information of the first user equipment in the first cell and the scheduling information of the second user equipment in the second cell, where the processing unit is further configured to obtain a SINR adjustment value of the first user equipment according to the SINR predictor and a SINR adjustment amount; and the processing unit is further configured to determine, according to a correspondence between a SINR and a modulation and coding scheme MCS, an MCS corresponding to the SINR adjustment value of the first user equipment.

With reference to the second aspect, in a first possible implementable manner, when the first user equipment needs to perform uplink data transmission, the processing unit is specifically configured to:

if the resource block used by the second user equipment is the same as the resource block used by the first user equipment, acquire, on the resource block, measurement information from the first user equipment to the first cell and interference prediction information of the first user equipment; and calculate the SINR predictor according to the measurement information from the first user equipment to the first cell and the interference prediction information of the first user equipment.

With reference to the first possible implementable manner, in a second possible implementable manner, the processing unit is specifically configured to:

calculate the SINR predictor according to channel information from the first user equipment to the first cell, transmit power of the first user equipment, channel information from the second user equipment to the first cell, the transmit power of the second user equipment, and an estimation on interference noise of a cell other than the first cell and the second cell against the first user equipment, where the channel information includes a channel response estimation.

With reference to the first possible implementable manner, in a third possible implementable manner, the processing unit is specifically configured to:

correct a historical SINR measurement value of the first user equipment according to channel information from the first user equipment to the first cell, the transmit power of the first user equipment, channel information from the second user equipment to the first cell, the transmit power of the second user equipment, and an estimation on interference noise of a cell other than the first cell and the second cell against the first user equipment, so as to calculate the SINR predictor, where the channel information includes reference signal received power and/or reference signal received quality.

With reference to the second possible implementable manner or the third possible implementable manner, in a fourth possible implementable manner, the first user equipment is coordinated multipoint CoMP user equipment but not multi-user multiple-input multiple-output MU-MIMO user equipment; or the first user equipment is MU-MIMO user equipment but not CoMP user equipment; or the first user equipment is both CoMP user equipment and MU-MIMO user equipment; or the first user equipment is neither CoMP user equipment nor MU-MIMO user equipment.

With reference to the second aspect, in a fifth possible implementable manner, when the first user equipment needs to perform downlink data transmission, the processing unit is specifically configured to:

if a resource block used by the second cell is the same as a resource block used by the first cell, acquire, on the resource block, measurement information from the first cell to the first user equipment and interference prediction information of the first user equipment, where the first cell is a cell in which a base station sends information to the first user equipment; and calculate the SINR predictor according to the measurement information from the first cell to the first user equipment and the interference prediction information of the first user equipment.

With reference to the fifth possible implementable manner, in a sixth possible implementable manner, the processing unit is specifically configured to:

correct a historical SINR measurement value of the first user equipment according to channel information from the first cell to the first user equipment, transmit power that is of the first cell and is for the first user equipment, a channel quality indicator reported by the first user equipment, channel information from the second cell to the first user equipment, transmit power of the second cell on the resource block, and an estimation on interference noise of a cell other than the first cell and the second cell against the first user equipment, so as to calculate the SINR predictor, where the channel information includes reference signal received power and/or reference signal received quality.

According to a third aspect, a base station is provided, including:

a memory, configured to store program code; and
a processor, configured to invoke the program code stored in the memory to execute the following method: acquiring scheduling information of first user equipment in a first cell, where the scheduling information includes a resource block and transmit power that are allocated to the first user equipment, where the method executed by the processor further includes:
acquiring scheduling information of second user equipment in a second cell, where the scheduling information includes a resource block and transmit power that are allocated to the second user equipment;

the processor is further configured to acquire a signal to interference plus noise ratio SINR predictor of the first user equipment according to the scheduling information of the first user equipment in the first cell and the scheduling information of the second user equipment in the second cell;

the processor is further configured to obtain a SINR adjustment value of the first user equipment according to the SINR predictor and a SINR adjustment amount; and the processor is further configured to determine, according to a correspondence between a SINR and a modulation and coding scheme MCS, an MCS corresponding to the SINR adjustment value of the first user equipment.

With reference to the third aspect, in a first possible implementable manner, when the first user equipment needs to perform uplink data transmission, the processor is specifically configured to:

if the resource block used by the second user equipment is the same as the resource block used by the first user equipment, acquire, on the resource block, measurement information from the first user equipment to the first cell and interference prediction information of the first user equipment; and calculate the SINR predictor according to the measurement information from the first user equipment to the first cell and the interference prediction information of the first user equipment.

With reference to the first possible implementable manner, in a second possible implementable manner, the processor is specifically configured to:

calculate the SINR predictor according to channel information from the first user equipment to the first cell, the transmit power of the first user equipment, channel information from the second user equipment to the first cell, the transmit power of the second user equipment, and an estimation on interference noise of a cell other than the first cell and the second cell against the first user equipment, where the channel information includes a channel response estimation.

With reference to the first possible implementable manner, in a third possible implementable manner, the processor is specifically configured to:

correct a historical SINR measurement value of the first user equipment according to channel information from the first user equipment to the first cell, the transmit power of the first user equipment, channel information from the second user equipment to the first cell, the transmit power of the second user equipment, and an estimation on interference noise of a cell other than the first cell and the second cell against the first user equipment, so as to calculate the SINR predictor, where the channel information includes reference signal received power and/or reference signal received quality.

With reference to the second possible implementable manner or the third possible implementable manner, in a fourth possible implementable manner, the first user equipment is coordinated multipoint CoMP user equipment but not multi-user multiple-input multiple-output MU-MIMO user equipment; or the first user equipment is MU-MIMO user equipment but not CoMP user equipment; or the first user equipment is both CoMP user equipment and MU-MIMO user equipment; or the first user equipment is neither CoMP user equipment nor MU-MIMO user equipment.

With reference to the third aspect, in a fifth possible implementable manner, when the first user equipment needs to perform downlink data transmission, the processor is specifically configured to:

if a resource block used by the second cell is the same as a resource block used by the first cell, acquire, on the resource block, measurement information from the first cell to the first user equipment and interference prediction information of the first user equipment, where the first cell is a cell in which a base station sends information to the first user equipment; and calculate the SINR predictor according to the measurement information from the first cell to the first user equipment and the interference prediction information of the first user equipment.

With reference to the fifth possible implementable manner, in a sixth possible implementable manner, the processor is specifically configured to:

correct a historical SINR measurement value of the first user equipment according to channel information from the first cell to the first user equipment, transmit power that is of the first cell and is for the first user equipment, a channel quality indicator reported by the first user equipment, channel information from the second cell to the first user equipment, transmit power of the second cell on the resource block, and an estimation on interference noise of a cell other than the first cell and the second cell against the first user equipment, so as to calculate the SINR predictor, where the channel information includes reference signal received power and/or reference signal received quality.

Compared with the prior art, according to the adaptive modulation and coding method and the apparatus that are provided in the embodiments of the present invention, scheduling information of another user equipment is acquired, and a factor of interference in current user equipment from the another user equipment can be considered. Therefore, accuracy for calculating a SINR predictor of scheduled user equipment in a current cell by a base station is improved. Further, an MCS is selected according to the SINR predictor, which improves accuracy of MCS selection and further improves a throughput rate of a wireless communications system.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention may be applied to multiple application scenarios including a transmit end and a receive end, where in uplink transmission, the transmit end is user equipment and the receive end is a base station, and in downlink transmission, the transmit end is a base station and the receive end is user equipment. Obviously, a method described in the embodiments of the present invention may be used in both uplink transmission and downlink transmission processes.

Figure 1:
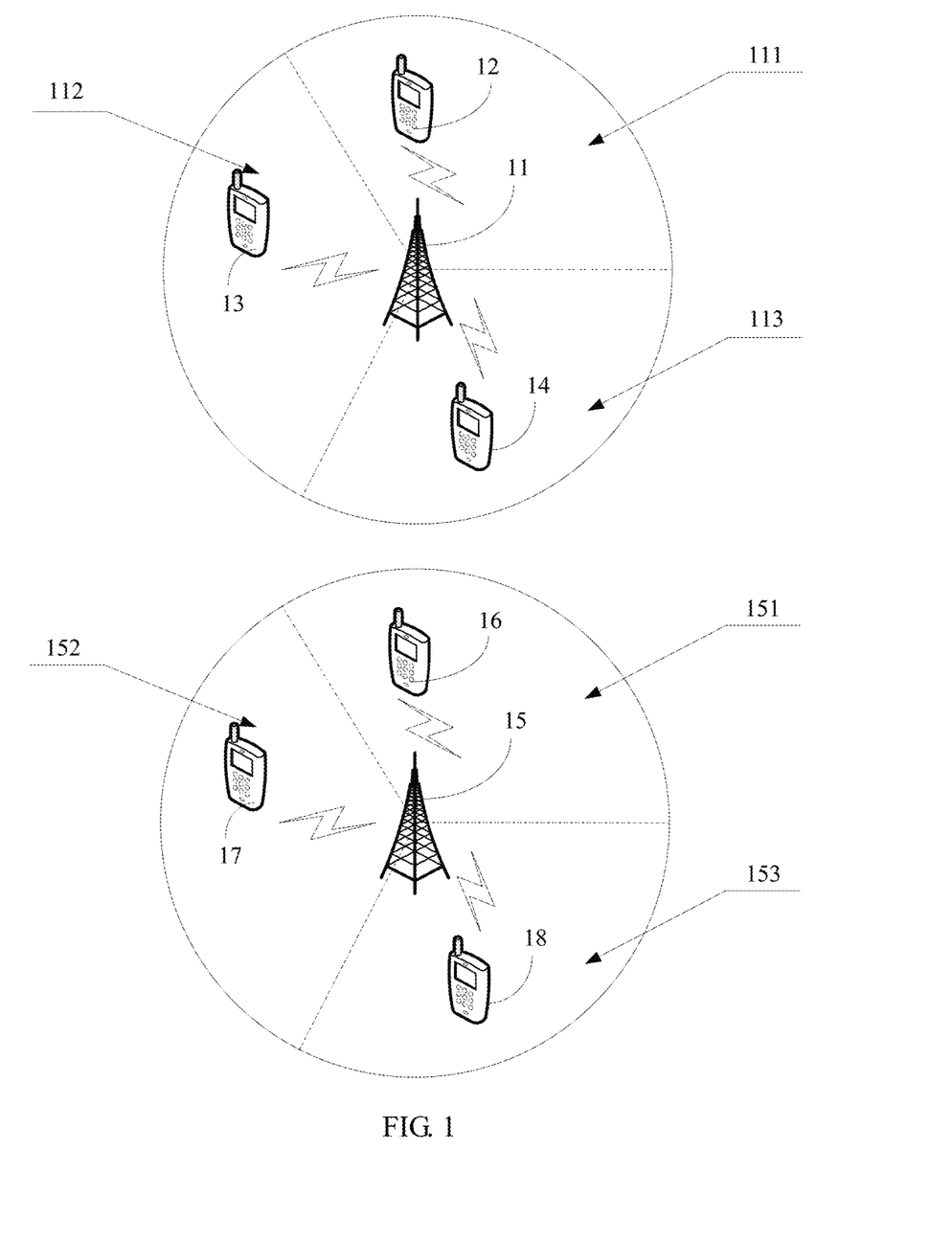
FIG. 1 is a schematic structural diagram of an LTE communications system according to an embodiment of the present invention.

As shown in FIG. 1, FIG. 1 is a schematic structural diagram of an LTE communications system, including a first base station 11, first user equipment 12, second user equipment 13, third user equipment 14, a second base station 15, fourth user equipment 16, fifth user equipment 17, and sixth user equipment 18. A coverage area of the first base station 11 may be shown by a solid-line circle in FIG. 1, and a dashed line shows that the coverage area of the first base station 11 is divided into a first cell 111, a second cell 112, and a third cell 113, where the first cell 111, the second cell 112, and the third cell 113 are neighboring to each other. The first user equipment 12 registers with the first cell 111, the second user equipment 13 registers with the second cell 112, and the third user equipment 14 registers with the third cell 113. The first user equipment 12, the second user equipment 13, and the third user equipment 14 separately perform wireless communication with the first base station. A coverage area of the second base station 15 may be shown by a solid-line circle in FIG. 1, and a dashed line shows that the coverage area of the second base station 15 is divided into a fourth cell 151, a fifth cell 152, and a sixth cell 153, where the fourth cell 151, the fifth cell 152, and the sixth cell 153 are neighboring to each other. The fourth user equipment 16 registers with the fourth cell 151, the fifth user equipment 17 registers with the fifth cell 152, and the sixth user equipment 18 registers with the sixth cell 153. The fourth user equipment 16, the fifth user equipment 17, and the sixth user equipment 18 separately perform wireless communication with the second base station.

Optionally, at least two cells of the first cell 111, the second cell 112, the third cell 113, the fourth cell 151, the fifth cell 152, and the sixth cell 153 form a coordinating cell set.

Figure 2:
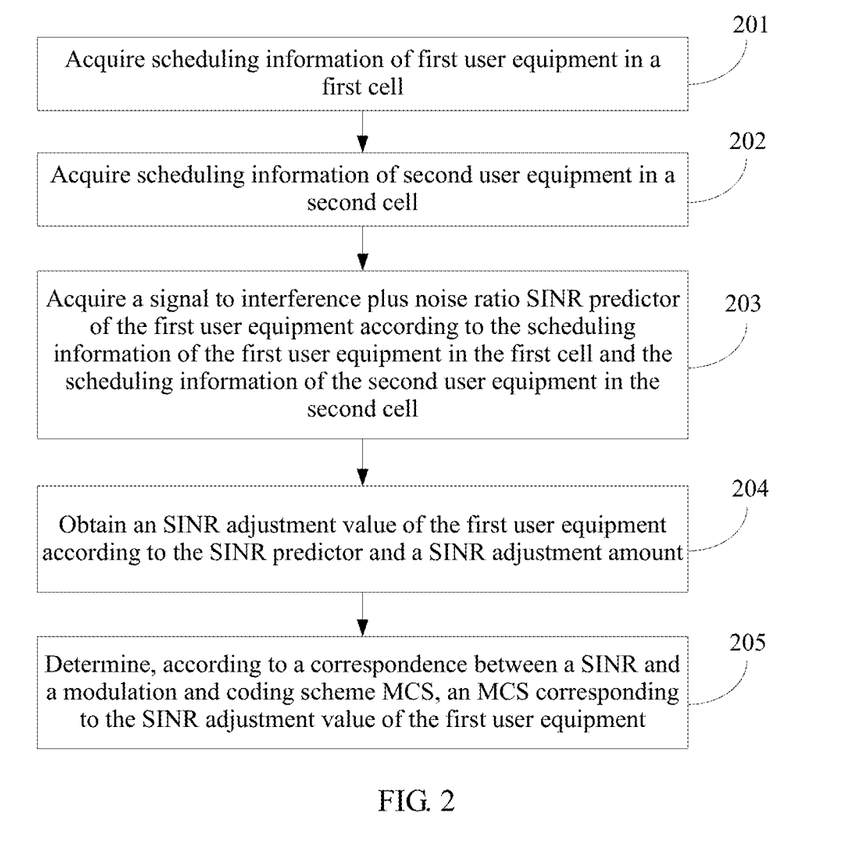
FIG. 2 is a flowchart of an adaptive modulation and coding method according to an embodiment of the present invention.

As shown in FIG. 2, an adaptive modulation and coding method provided in an embodiment of the present invention is applied to a base station and includes:

Step 201: Acquire scheduling information of first user equipment in a first cell.

The first user equipment registers with the first cell. The first UE communicates with the base station through the first cell. The base station allocates the scheduling information to the scheduled first UE, where the scheduling information includes a resource block and transmit power that are allocated to the first UE in the first cell by the base station, and the first cell belongs to the base station.

Step 202: Acquire scheduling information of second user equipment in a second cell.

The second UE in the second cell interferes with the first UE in the first cell. The second cell may belong to a same base station as the first cell, and the base station may directly acquire the scheduling information of the second UE in the second cell. Optionally, a base station to which the second cell belongs is different from the base station to which the first cell belongs, and the base station to which the first cell belongs may exchange, by using an X2 interface or an S1 interface, the scheduling information with the base station to which the second cell belongs. The scheduling information of the second UE in the second cell includes a resource block and transmit power that are allocated to the second UE in the second cell by the base station to which the second cell belongs. In the method described in the present invention, at least one second user equipment in the second cell is included.

The base station may acquire, in one transmission time interval (Transmission Time Interval, TTI), scheduling information of the at least one second user equipment in the second cell.

Step 203: Acquire a signal to interference plus noise ratio SINR predictor of the first user equipment according to the scheduling information of the first user equipment in the first cell and the scheduling information of the second user equipment in the second cell.

Step 204: Obtain a SINR adjustment value of the first user equipment according to the SINR predictor and a SINR adjustment amount.

The base station collects statistics about an uplink block error rate (Block Error Rate, BLER), calculates the SINR adjustment amount, and adjusts the SINR predictor by using the SINR adjustment amount to obtain the SINR adjustment value of the UE. If the uplink BLER does not meet a preset BLER target value, an adjustment amount in a current adjustment cycle is increased based on an adjustment amount in a previous cycle according to a preset adjustment range; or if the uplink BLER is greater than a BLER target value, an adjustment amount in a current adjustment cycle is decreased based on an adjustment amount in a previous cycle according to a preset adjustment range.

Step 205: Determine, according to a correspondence between a SINR and a modulation and coding scheme MCS, an MCS corresponding to the SINR adjustment value of the first user equipment.

The base station schedules the first UE in the first cell by using the MCS corresponding to the SINR adjustment value of the first UE.

Compared with the prior art, in this embodiment of the present invention, scheduling information of another user equipment is acquired, and a factor of interference in current user equipment from the another user equipment can be considered. Therefore, accuracy for calculating a SINR predictor of scheduled user equipment in a current cell by a base station is improved. Further, an MCS is selected according to the SINR predictor, which improves accuracy of MCS selection and further improves a throughput rate of a wireless communications system.

Figure 3:
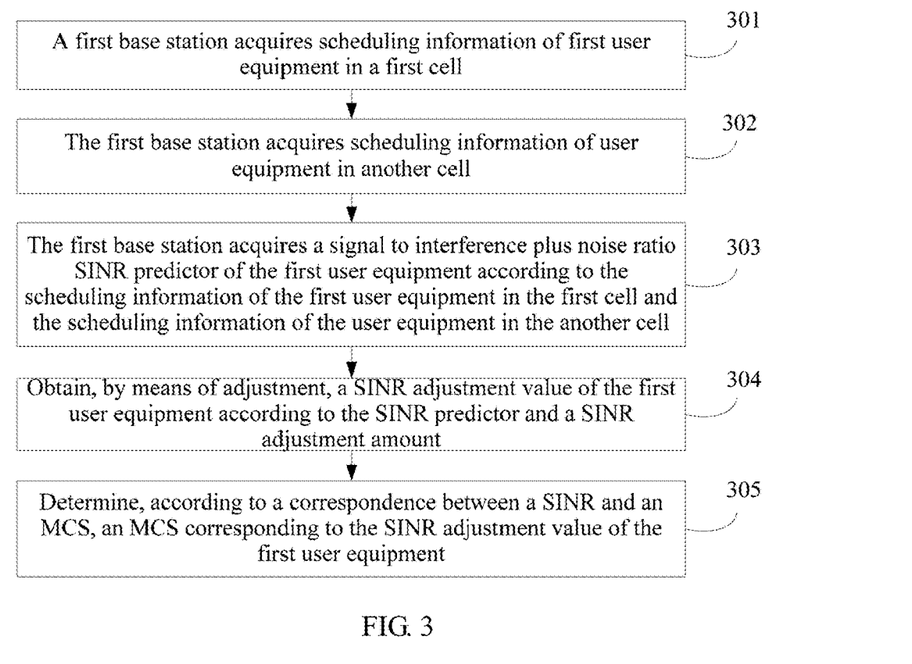
FIG. 3 is a flowchart of another adaptive modulation and coding method according to an embodiment of the present invention.

An embodiment of the present invention provides an adaptive modulation and coding method, which is applied to an LTE communications system shown in FIG. 1. It is assumed that first user equipment and second user equipment need to perform uplink data transmission with a first base station and that fourth user equipment, fifth user equipment, and sixth user equipment need to perform uplink data transmission with a second base station. The first user equipment is used as an example. As shown in FIG. 3, the method includes:

Step 301: The first base station acquires scheduling information of the first user equipment in a first cell.

The first base station allocates a resource block and transmit power to the first user equipment in the first cell, where the scheduling information of the first user equipment in the first cell includes the resource block and the transmit power of the first user equipment.

Step 302: The first base station acquires scheduling information of user equipment in another cell.

The first base station allocates a resource block and transmit power to the second user equipment in a second cell, where scheduling information of the second user equipment in the second cell includes the resource block and the transmit power of the second user equipment. The second base station allocates a resource block and transmit power to the fourth user equipment in a fourth cell, where scheduling information of the fourth user equipment in the fourth cell includes the resource block and the transmit power of the fourth user equipment. The second base station allocates a resource block and transmit power to the fifth user equipment in a fifth cell, where scheduling information of the fifth user equipment in the fifth cell includes the resource block and the transmit power of the fifth user equipment. The second base station allocates a resource block and transmit power to the sixth user equipment in a sixth cell, where scheduling information of the sixth user equipment in the sixth cell includes the resource block and the transmit power of the sixth user equipment. Then, the first base station acquires the scheduling information of the second user equipment in the second cell by using an internal interface, and the first base station acquires, from the second base station, the scheduling information of the fourth user equipment in the fourth cell, the scheduling information of the fifth user equipment in the fifth cell, and the scheduling information of the sixth user equipment in the sixth cell by using an X2 interface.

It should be noted that the another cell also acquires scheduling information of user equipment in a cell besides the another cell. That is, a cell may acquire, in one TTI, scheduling information of user equipment in the cell and scheduling information of user equipment that registers in a cell of another base station.

Figure 4:
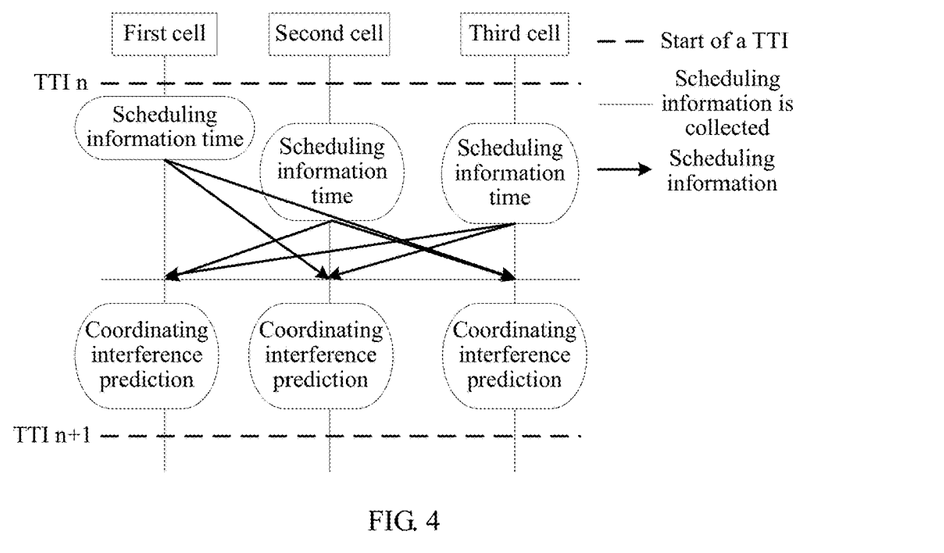
FIG. 4 is a flowchart of still another adaptive modulation and coding method according to an embodiment of the present invention.

Exemplarily, as shown in FIG. 4, the first cell, the second cell, and a third cell are cells of a same coordinating cell set. Starting from the $n^{th}$ TTI to the $(n+1)^{th}$ TTI, the first cell acquires the scheduling information of the second cell and that of the third cell, the second cell acquires the scheduling information of the first cell and that of the third cell, and the third cell acquires the scheduling information of the first cell and that of the second cell. After the first cell, the second cell, and the third cell each acquire their own scheduling information and the scheduling information of the other cells, the first cell, the second cell, and the third cell separately perform a coordinating interference prediction to acquire SINR predictors.

It should be noted that the first cell and the another cell that are described in the present invention may be cells of one coordinating cell set, where the coordinating cell set includes at least two cells and may be statically or dynamically set. The cells included in the coordinating cell set may also be cells of different base stations, and exchange scheduling information among multiple base stations by using an optical fiber or Ethernet (for example, an Internet Protocol radio access network IPRAN); however, it should be ensured that the cells in the coordinating cell set are synchronous.

Step 303: The first base station acquires a SINR predictor of the first user equipment according to the scheduling information of the first user equipment in the first cell and the scheduling information of the user equipment in the another cell.

First, after a resource block and transmit power of user equipment of all cells are exchanged, the first cell compares each resource block (RB) allocated to the first user equipment with a resource block in the received scheduling information of the another cell. If the resource block used by the second user equipment in the second cell and the resource block allocated to the first user equipment include a same resource block, the second user equipment is set as an interference source, on the resource block, of the first user equipment in the first cell. Likewise, if the resource block used by the fourth user equipment in the fourth cell also includes the resource block allocated to the first user equipment, the fourth user equipment is set as an interference source, on the resource block, of the first user equipment in the first cell. A method for determining whether the fifth cell and the sixth cell are interference sources for the user equipment in the first cell is the same as that for determining whether the fourth cell is an interference source for the user equipment in the first cell.

Figure 5:
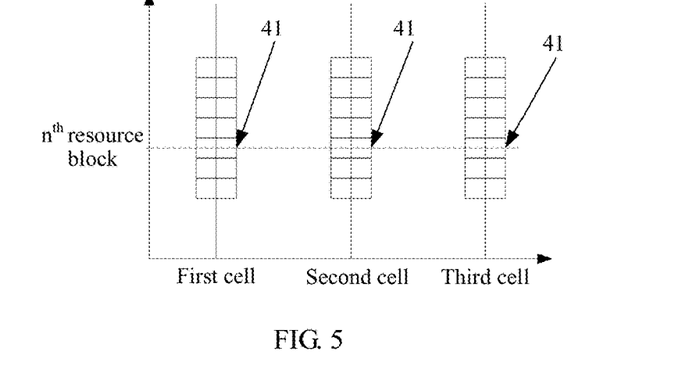
FIG. 5 is a flowchart of yet another adaptive modulation and coding method according to an embodiment of the present invention.

Exemplarily, as shown in FIG. 5, it is assumed that: the resource block allocated to the first user equipment in the first cell includes the $n^{th}$ resource block (Resource Block, RB) 41, the resource block allocated to the second user equipment in the second cell also includes the $n^{th}$ resource block, and a resource block allocated to third user equipment in the third cell also includes the $n^{th}$ resource block. Because a frequency reuse factor of the LTE communications system is 1, when user equipments that occupy a same resource block simultaneously use the same resource block, the user equipments interfere with each other. Therefore, on the $n^{th}$ resource block, the second user equipment in the second cell and the third user equipment in the third cell are interference sources of the first user equipment in the first cell.

It should be noted that, when much scheduling information of user equipment is acquired, the first cell may sort all interference sources according to signal strength, and select an interference source whose interference intensity reaches a preset threshold or select a preset quantity of interference sources.

Then, the first cell acquires, on the resource block, measurement information from the first user equipment to the first cell and interference prediction information of the first user equipment, and calculates the SINR predictor according to the measurement information from the first user equipment to the first cell and the interference prediction information of the first user equipment.

Specifically, the first cell of the first base station acquires channel information from the first user equipment to the first cell, the transmit power of the first user equipment, channel information from user equipment that uses the same resource block as the first user equipment to the first cell, transmit power of the user equipment that uses the same resource block as the first user equipment, and an estimation on interference noise of a cell other than the first cell and the another cell against the first user equipment, and calculates the SINR predictor, where the channel information includes a channel response estimation.

Exemplarily, a SINR predictor on each subcarrier of each RB allocated to user equipment may be calculated according to a formula (1.1a), and then the SINR predictors of all the subcarriers are combined into a SINR predictor, on scheduled bandwidth, of the user equipment.

$$\gamma_{n,j} = \frac{p_{n,j} w_{n,j} h_{n,j} h_{n,j}^H w_{n,j}^H}{w_{n,j} R_{zz,n,j} w_{n,j}^H}, \quad (1.1a)$$

where $\gamma_{n,j}$ is a SINR on a subcarrier j of the $n^{th}$ RB, $p_{n,j}$ is transmit power of user equipment on the subcarrier j of the $n^{th}$ RB, $w_{n,j}$ is a signal detection weight vector of the user equipment on the subcarrier j of the $n^{th}$ RB, $h_{n,j}$ is a channel response vector of the user equipment on the subcarrier j of the $n^{th}$ RB, $R_{zz,n,j}$ is a covariance matrix for interference noise, and $(\bullet)^H$ indicates a conjugate transpose.

Then, the SINRs on the subcarriers are combined into a SINR $\gamma_n$ at an RB level, and then SINRs at the RB level are combined into the SINR predictor of the user equipment, where a combination formula depends on a used receiver. For example, when a minimum mean square error (Minimum Mean Square Error, MMSE) receiver is used, the SINRs on the subcarriers may be first combined into the SINR $\gamma_n$ at the RB level by using a formula (1.2), and then the SINRs at the RB level are combined into the SINR predictor of the user equipment by using the formula (1.2), where the formula (1.2) is as follows:

$$\gamma = \frac{\sum_{l=1}^{L} \frac{\gamma_l}{1+\gamma_l}}{L - \sum_{l=1}^{L} \frac{\gamma_l}{1+\gamma_l}}, \quad (1.2)$$

where

L is a quantity of elements in a combination set, that is, a quantity of subcarriers or a quantity of RBs.

Optionally, when the channel information includes reference signal received power and/or reference signal received quality, a historical SINR measurement value on each subcarrier of each RB allocated to the user equipment may also be corrected based on the channel information from the first user equipment to the first cell, the transmit power of the first user equipment, the channel information from the user equipment that uses the same resource block as the first user equipment to the first cell, the transmit power of the user equipment that uses the same resource block as the first user equipment, and the estimation on the interference noise of a cell other than the first cell and the another cell against the first user equipment, so as to calculate the SINR predictor, as shown by a formula (1.1b):

$$\gamma(t) = \gamma_{measure}(t-T) + \lambda(t) \cdot [I(t-T) - I(t)] \quad (1.1b), \text{ where}$$

$\gamma_{measure}(t-T)$ indicates a historical SINR measurement value that is measured at a moment t−T, which is obtained by using the reference signal received power and/or the reference signal received quality from the first user equipment to the first cell, the transmit power of the first user equipment, a historical SINR measurement value of the first user equipment, the channel information from the user equipment that uses the same resource block as the first user equipment to the first cell, the transmit power of the user equipment that uses the same resource block as the first user equipment, and the estimation on the interference noise of the cell other than the first cell and the second cell against the first user equipment; I(t−T) indicates information about interference intensity measured at the moment t−T; I(t) indicates information about interference intensity that is corresponding to actual data transmission at a moment t and that is predicted in current scheduling; and λ(t) is a currently maintained SINR correction weight value, where λ(t)>0. If it is predicted that interference at the moment t is stronger than that at the moment t−T, that is, I(t)>I(t−T), the SINR predictor is decreased; if it is predicted that interference at the moment t is weaker than that at the moment t−T, the SINR predictor is increased.

Then, the SINRs on the subcarriers are combined into the SINR $\gamma_n$ at the RB level, and then the SINRs at the RB level are combined into the SINR predictor of the user equipment, where the combination formula depends on the used receiver. For example, the formula (1.2) is used for calculation.

The measurement information may include the channel information from the first user equipment to the first cell and the transmit power of the first user equipment. The interference prediction information may include the channel information from the user equipment that uses the same resource block as the first user equipment to the first cell, the transmit power of the user equipment that uses the same resource block as the first user equipment, and the estimation on the interference noise of the cell other than the first cell and the another cell against the first user equipment. The first user equipment is any user equipment of scheduled user equipment in the first cell.

It should be noted that, in the LTE communications system, information about channels from the user equipment to multiple cells may be measured by using a demodulation reference signal (DeModulation Reference Signal, DMRS) or a sounding reference signal (Sounding Reference Signal, SRS) sent by the user equipment, where the channel information includes reference signal received power, reference signal received quality, and/or a channel response estimation.

Further, for the estimation on the interference noise of the cell other than the first cell and the another cell against the first user equipment, estimation may be performed by tracking a historical value, so as to obtain a more accurate coordinating interference prediction. To estimate the estimation of the interference noise of the cell other than the first cell and the another cell against the first user equipment, actually received total interference noise needs to be measured and information about interference of a measured cell needs to be subtracted. Because scheduling information outside the cell set cannot be obtained, a filtering value may be used as an estimation value of remaining interference noise outside the cell set during actual data transmission, for example, interference in the first user equipment from an interference source and background noise outside the coordinating cell set.

Step 304: Obtain, by means of adjustment, a SINR adjustment value of the first user equipment according to the SINR predictor and a SINR adjustment amount.

Step 305: Determine, according to a correspondence between a SINR and an MCS, an MCS corresponding to the SINR adjustment value of the first user equipment.

The first base station queries the correspondence between a SINR and an MCS by using the SINR adjustment value, and selects the MCS that needs to be used by the first user equipment. Further, the first cell sends the selected MCS to the first user equipment, so that the first user equipment performs uplink data transmission by using a modulation and coding scheme represented by the MCS. It should be noted that, a SINR adjustment mechanism and the correspondence between a SINR and an MCS are exactly the same as those in an existing solution. There are 29 modulation and coding schemes from MCS 0 to MCS 28 defined in a 3GPP protocol, each of which represents a different modulation scheme and channel coding rate. A proper MCS is selected according to different channel conditions, so as to maximize a throughput rate of a wireless communications system.

Especially, in a scenario of coordinated multiple points (Coordinated Multiple Point, CoMP), an interference source is determined according to the coordinated multiple points. For example, coordinated multiple points of the first user equipment are the first cell and the second cell. The interference source of the first user equipment not only includes user equipment interfering with the first cell, but also includes user equipment interfering with the second cell. On the $n^{th}$ resource block, the second user equipment and the third user equipment are not only interference sources of the first user equipment in the first cell, but also interference sources of the first user equipment in the second cell. CoMP coordinated multipoint transmission refers to that multiple geographically separated transmission points collaboratively participate in joint reception of data sent by a terminal.

In a multi-user multiple-input multiple-output (Multi-User Multiple Input Multiple Output, MU-MIMO) scenario, during prediction of the SINR predictor, a current cell needs to take matched user equipment in the current cell and user equipment in a coordinating cell set as interference sources. For example, both the first user equipment and the second user equipment register with the first cell, the third user equipment registers with the second cell, and the first cell and the second cell are cells in a coordinating cell set. When the $n^{th}$ RB is allocated to the first user equipment, and the $n^{th}$ RB is also allocated to both the second user equipment and the third user equipment, the first cell needs to set the second user equipment and the third user equipment as the interference sources of the first user equipment on the $n^{th}$ RB.

Compared with the prior art, according to the adaptive modulation and coding method described in this embodiment of the present invention, scheduling information of another user equipment is acquired, and a factor of interference in current user equipment from the another user equipment can be considered. Therefore, accuracy for calculating a SINR predictor of scheduled user equipment in a current cell by a base station is improved. Further, an MCS is selected according to the SINR predictor, which improves accuracy of MCS selection and further improves a throughput rate of a wireless communications system.

It should be noted that, using the first user equipment as an example, when the first user equipment needs to perform downlink data transmission with the first base station, the first base station may acquire, according to a method for acquiring scheduling information when user equipment performs uplink data transmission with a base station, scheduling information of user equipment that is in another cell and that performs downlink data transmission. Reference may be made to the method involving uplink data transmission, and details are not described again in the present invention.

Then, the first base station compares each resource block (RB) that is used by the first cell to send information to the first user equipment with a resource block (RB) that is used by another cell to send information to user equipment in the another cell; if a resource block used by the second cell also includes a resource block used by the first cell, sets the second cell as an interference source on the resource block for the first cell; and if a resource block used by the third cell also includes the resource block used by the first cell, sets the third cell as an interference source on the resource block for the first cell.

Further, measurement information from the first cell to the first user equipment and the interference prediction information of the first user equipment are acquired on the same resource block used as the first cell, and the SINR predictor is calculated according to the measurement information from the first cell to the first user equipment and the interference prediction information of the first user equipment.

Specifically, when the first user equipment needs to perform downlink data transmission with the first base station, the channel information includes reference signal received power and/or reference signal received quality; therefore, according to acquired channel information from the first cell to the first user equipment, transmit power that is of the first cell and is for the first user equipment, a channel quality indicator reported by the first user equipment, channel information from the cell that uses the same resource block as the first cell to the first user equipment, transmit power, on the resource block, of the cell that uses the same resource block as the first cell, and the estimation on interference noise of the cell other than the first cell and the another cell against the first user equipment, the first base station may correct a historical SINR measurement value on each subcarrier of each RB allocated to the user equipment, so as to calculate the SINR predictor.

Exemplarily, the SINR predictor on each subcarrier of each RB may be calculated according to a formula (1.1b), and the formula (1.1b) is as follows:

$$\gamma(t)=\gamma_{measure}(t-T)+\lambda(t)\cdot[I(t-T)-I(t)] \quad (1.1b), \text{ where}$$

$\gamma_{measure}(t-T)$ indicates a SINR predictor measured at a moment t−T, I(t−T) indicates information about interference intensity measured at the moment t−T, I(t) indicates information about interference intensity that is corresponding to actual data transmission at a moment t and that is predicted in current scheduling, and $\lambda(t)$ is a currently maintained SINR correction weight value, where $\lambda(t)>0$. If it is predicted that interference at the moment t is stronger than that at the moment t−T, that is I(t)>I(t−T), the SINR predictor is decreased; if it is predicted that interference at the moment t is weaker than that at the moment t−T, the SINR predictor is increased.

Then, the SINRs on the subcarriers are combined into a SINR $\gamma_n$ at an RB level, and then the SINRs at the RB level are combined into the SINR predictor of the user equipment, where a combination formula depends on the used receiver. For example, a formula (1.2) is used for calculation.

Finally, the first base station obtains, by means of adjustment, the SINR adjustment value of the first user equipment according to the SINR predictor and the SINR adjustment amount, and determines, according to the correspondence between a SINR and an MCS, the MCS corresponding to the SINR adjustment value of the first user equipment.

Compared with the prior art, according to the adaptive modulation and coding method described in this embodiment of the present invention, scheduling information of another user equipment is acquired, and a factor of interference in current user equipment from the another user equipment can be considered. Therefore, accuracy for calculating a SINR predictor of scheduled user equipment in a current cell by a base station is improved. Further, an MCS is selected according to the SINR predictor, which improves accuracy of MCS selection and further improves a throughput rate of a wireless communications system.

Figure 6:
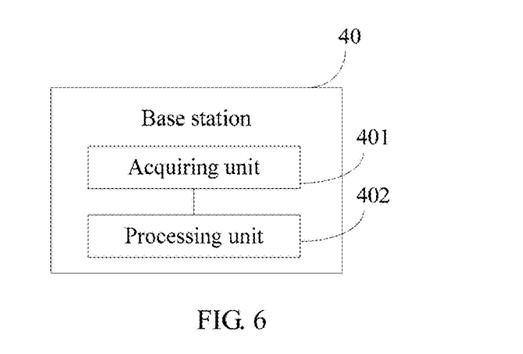
FIG. 6 is a schematic structural diagram of a base station according to an embodiment of the present invention.

An embodiment of the present invention provides a base station 40, as shown in FIG. 6, including an acquiring unit 401 and a processing unit 402.

The acquiring unit 401 is configured to acquire scheduling information of first user equipment in a first cell, where the scheduling information includes a resource block and transmit power that are allocated to the first user equipment.

The acquiring unit 401 is further configured to acquire scheduling information of second user equipment in a second cell, where the scheduling information includes a resource block and transmit power that are allocated to the second user equipment.

The second UE in the second cell interferes with the first UE in the first cell. The second cell may belong to a same base station as the first cell, and the base station may directly acquire the scheduling information of the second UE in the second cell. Optionally, a base station to which the second cell belongs is different from a base station to which the first cell belongs, and the base station to which the first cell belongs may exchange, by using an X2 interface or an S1 interface, the scheduling information with the base station to which the second cell belongs. The scheduling information of the second UE in the second cell includes the resource block and the transmit power that are allocated to the second UE in the second cell by the base station to which the second cell belongs. According to the base station described in the present invention, at least one user equipment in the second cell is included. The base station may acquire, in one TTI, scheduling information of at least one second user equipment in the second cell. It should be noted that, another cell also acquires scheduling information of user equipment in the first cell. That is, a cell may obtain, in one TTI, scheduling information of user equipment in the cell and scheduling information of user equipment that registers in a cell of another base station.

The processing unit 402 is configured to acquire a signal to interference plus noise ratio SINR predictor of the first user equipment according to the scheduling information of the first user equipment in the first cell and the scheduling information of the second user equipment in the second cell.

The processing unit 402 is further configured to obtain a SINR adjustment value of the first user equipment according to the SINR predictor and a SINR adjustment amount.

The processing unit 402 is further configured to determine, according to a correspondence between a SINR and a modulation and coding scheme MCS, an MCS corresponding to the SINR adjustment value of the first user equipment.

The base station schedules the first UE in the first cell by using the MCS corresponding to the SINR adjustment value of the first UE.

Compared with the prior art, in this embodiment of the present invention, scheduling information of another user equipment is acquired, and a factor of interference in current user equipment from the another user equipment can be considered. Therefore, accuracy for calculating a SINR predictor of scheduled user equipment in a current cell by a base station is improved. Further, an MCS is selected according to the SINR predictor, which improves accuracy of MCS selection and further improves a throughput rate of a wireless communications system.

When the first user equipment needs to perform uplink data transmission, the processing unit 402 is specifically configured to:

if the resource block used by the second user equipment is the same as the resource block used by the first user equipment, acquire, on the resource block, measurement information from the first user equipment to the first cell and interference prediction information of the first user equipment; and calculate the SINR predictor according to the measurement information from the first user equipment to the first cell and the interference prediction information of the first user equipment.

The processing unit 402 is specifically configured to:

calculate the SINR predictor according to channel information from the first user equipment to the first cell, the transmit power of the first user equipment, channel information from the second user equipment to the first cell, the transmit power of the second user equipment, and an estimation on interference noise of a cell other than the first cell and the second cell against the first user equipment, where the channel information includes a channel response estimation.

Exemplarily, a SINR predictor on each subcarrier of each RB allocated to user equipment may be obtained by means of calculation according to a formula (1.1a), and then a SINR predictor of the user equipment is obtained by means of calculation according to a formula (1.2):

$$\gamma_{n,j} = \frac{p_{n,j} w_{n,j} h_{n,j} h_{n,j}^H w_{n,j}^H}{w_{n,j} R_{zz,n,j} w_{n,j}^H} \text{ and;} \quad (1.1a)$$

$$\gamma = \frac{\sum_{l=1}^{L}\frac{\gamma_l}{1+\gamma_l}}{L-\sum_{l=1}^{L}\frac{\gamma_l}{1+\gamma_l}}. \qquad (1.2)$$

The processing unit 402 is specifically configured to:

correct a historical SINR measurement value of the first user equipment according to channel information from the first user equipment to the first cell, the transmit power of the first user equipment, channel information from the second user equipment to the first cell, the transmit power of the second user equipment, and an estimation on interference noise of a cell other than the first cell and the second cell against the first user equipment, so as to calculate the SINR predictor, where the channel information includes reference signal received power and/or reference signal received quality.

For example, the SINR predictor on each subcarrier of each RB allocated to the user equipment is corrected by using a formula (1.1b):

$$\gamma(t) = \gamma_{measure}(t-T) + \lambda(t) \cdot [I(t-T) - I(t)] \qquad (1.1b).$$

Then the SINR predictor of the user equipment is obtained by means of calculation according to the formula (1.2):

$$\gamma = \frac{\sum_{l=1}^{L}\frac{\gamma_l}{1+\gamma_l}}{L-\sum_{l=1}^{L}\frac{\gamma_l}{1+\gamma_l}}. \qquad (1.2)$$

It should be noted that when the first user equipment needs to perform uplink data transmission, the first user equipment is coordinated multipoint user equipment but not multi-user multiple-input multiple-output MU-MIMO user equipment; or the first user equipment is MU-MIMO user equipment but not CoMP user equipment; or the first user equipment is both CoMP user equipment and MU-MIMO user equipment; or the first user equipment is neither CoMP user equipment nor MU-MIMO user equipment.

Especially, in a scenario of coordinated multiple points, an interference source is determined according to the coordinated multiple points. For example, coordinated multiple points of the first user equipment are the first cell and the second cell. An interference source of the first user equipment not only includes user equipment interfering with the first cell, but also includes user equipment interfering with the second cell. On the $n^{th}$ resource block, the second user equipment and third user equipment are not only interference sources of the first user equipment in the first cell, but also interference sources of the first user equipment in the second cell. CoMP coordinated multipoint transmission refers to that multiple geographically separated transmission points collaboratively participate in joint reception of data sent by a terminal.

In a multi-user multiple-input multiple-output scenario, during prediction of the SINR predictor, a current cell needs to take matched user equipment in the current cell and user equipment in a coordinating cell set as interference sources. For example, both the first user equipment and the second user equipment register with the first cell, the third user equipment registers with the second cell, and the first cell and the second cell are cells in a coordinating cell set. When the $n^{th}$ RB is allocated to the first user equipment, and the $n^{th}$ RB is also allocated to both the second user equipment and the third user equipment, the first cell needs to set the second user equipment and the third user equipment as the interference sources of the first user equipment on the $n^{th}$ RB.

When the first user equipment needs to perform downlink data transmission, the processing unit 402 is specifically configured to:

if a resource block used by the second cell is the same as a resource block used by the first cell, acquire, on the resource block, measurement information from the first cell to the first user equipment and interference prediction information of the first user equipment, where the first cell is a cell in which the base station sends information to the first user equipment; and calculate the SINR predictor according to the measurement information from the first cell to the first user equipment and the interference prediction information of the first user equipment.

The processing unit 402 is specifically configured to:

correct a historical SINR measurement value of the first user equipment according to channel information from the first cell to the first user equipment, transmit power that is of the first cell and is for the first user equipment, a channel quality indicator reported by the first user equipment, channel information from the second cell to the first user equipment, transmit power of the second cell on the resource block, and an estimation on interference noise of a cell other than the first cell and the second cell against the first user equipment, so as to calculate the SINR predictor, where the channel information includes reference signal received power and/or reference signal received quality.

For example, the SINR predictor on each subcarrier of each RB allocated to the user equipment is corrected by using the formula (1.1b):

$$\gamma(t) = \gamma_{measure}(t-T) + \lambda(t) \cdot [I(t-T) - I(t)] \qquad (1.1b).$$

Then the SINR predictor of the user equipment is obtained by means of calculation according to the formula (1.2):

$$\gamma = \frac{\sum_{l=1}^{L}\frac{\gamma_l}{1+\gamma_l}}{L-\sum_{l=1}^{L}\frac{\gamma_l}{1+\gamma_l}}. \qquad (1.2)$$

Figure 7:
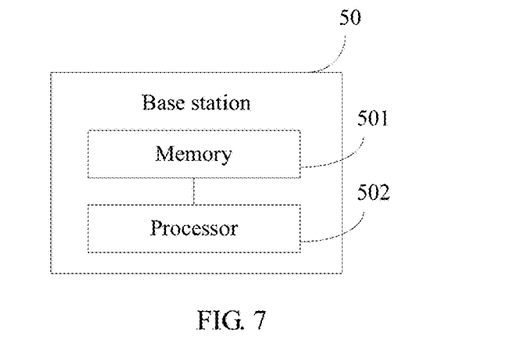
FIG. 7 is a schematic structural diagram of another base station according to an embodiment of the present invention.

An embodiment of the present invention provides a base station 50, as shown in FIG. 7, including:

a memory 501, configured to store program code; and a processor 502, configured to invoke the program code stored in the memory to execute the following method: acquiring scheduling information of first user equipment in a first cell, where the scheduling information includes a resource block and transmit power that are allocated to the first user equipment.

The method executed by the processor 502 further includes:

acquiring scheduling information of second user equipment in a second cell, where the scheduling information includes a resource block and transmit power that are allocated to the second user equipment.

The second UE in the second cell interferes with the first UE in the first cell. The second cell may belong to a same base station as the first cell, and the base station may directly acquire the scheduling information of the second UE in the second cell. Optionally, a base station to which the second cell belongs is different from a base station to which the first cell belongs, and the base station to which the first cell belongs may exchange, by using an X2 interface or an S1 interface, the scheduling information with the base station to which the second cell belongs. The scheduling information of the second UE in the second cell includes the resource block and the transmit power that are allocated to the second UE in the second cell by the base station to which the second cell belongs. According to the base station described in the present invention, at least one user equipment in the second cell is included. The base station may acquire, in one TTI, scheduling information of at least one second user equipment in the second cell. It should be noted that, another cell also acquires scheduling information of user equipment in the first cell. That is, a cell may obtain, in one TTI, scheduling information of user equipment in the cell and scheduling information of user equipment that registers in a cell of another base station.

The processor 502 is further configured to acquire a signal to interference plus noise ratio SINR predictor of the first user equipment according to the scheduling information of the first user equipment in the first cell and the scheduling information of the second user equipment in the second cell.

The processor 502 is further configured to obtain a SINR adjustment value of the first user equipment according to the SINR predictor and a SINR adjustment amount.

The processor 502 is further configured to determine, according to a correspondence between a SINR and a modulation and coding scheme MCS, an MCS corresponding to the SINR adjustment value of the first user equipment.

The base station schedules the first UE in the first cell by using the MCS corresponding to the SINR adjustment value of the first UE.

Compared with the prior art, in this embodiment of the present invention, scheduling information of another user equipment is acquired, and a factor of interference in current user equipment from the another user equipment can be considered. Therefore, accuracy for calculating a SINR predictor of scheduled user equipment in a current cell by a base station is improved. Further, an MCS is selected according to the SINR predictor, which improves accuracy of MCS selection and further improves a throughput rate of a wireless communications system.

It should be noted that, the processor is further configured to execute a specific step that is required in performing uplink data transmission or downlink data transmission by the user equipment, and reference may be made to the descriptions on a method side.

It may be clearly understood by a person skilled in the art that, for the purpose of convenient and brief description, for a detailed working process of the foregoing apparatus and unit, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An adaptive modulation and coding method, comprising:
  acquiring scheduling information of first user equipment in a first cell, wherein the scheduling information comprises a resource block and transmit power that are allocated to the first user equipment;
  acquiring scheduling information of second user equipment in a second cell, wherein the scheduling information comprises a resource block and transmit power that are allocated to the second user equipment;
  acquiring a signal to interference plus noise ratio (SINR) predictor of the first user equipment according to the scheduling information of the first user equipment in the first cell and the scheduling information of the second user equipment in the second cell;
  obtaining a SINR adjustment value of the first user equipment according to the SINR predictor and a SINR adjustment amount; and
  determining, according to a correspondence between a SINR and a modulation and coding scheme (MCS), an MCS corresponding to the SINR adjustment value of the first user equipment.

2. The adaptive modulation and coding method according to claim 1, wherein when the first user equipment needs to perform uplink data transmission, the acquiring a SINR predictor of the first user equipment according to the scheduling information of the first user equipment in the first cell and the scheduling information of the second user equipment in the second cell comprises:

if the resource block used by the second user equipment is the same as the resource block used by the first user equipment, acquiring, on the resource block, measurement information from the first user equipment to the first cell and interference prediction information of the first user equipment; and calculating the SINR predictor according to the measurement information from the first user equipment to the first cell and the interference prediction information of the first user equipment.

3. The adaptive modulation and coding method according to claim 2, wherein the calculating the SINR predictor according to the measurement information from the first user equipment to the first cell and the interference prediction information of the first user equipment comprises:

calculating the SINR predictor according to channel information from the first user equipment to the first cell, the transmit power of the first user equipment, channel information from the second user equipment to the first cell, the transmit power of the second user equipment, and an estimation on interference noise of a cell other than the first cell and the second cell against the first user equipment, wherein the channel information comprises a channel response estimation.

4. The adaptive modulation and coding method according to claim 2, wherein the calculating the SINR predictor according to the measurement information from the first user equipment to the first cell and the interference prediction information of the first user equipment comprises:

correcting a historical SINR measurement value of the first user equipment according to channel information from the first user equipment to the first cell, the transmit power of the first user equipment, channel information from the second user equipment to the first cell, the transmit power of the second user equipment, and an estimation on interference noise of a cell other than the first cell and the second cell against the first user equipment, so as to calculate the SINR predictor, wherein the channel information comprises reference signal received power and/or reference signal received quality.

5. The adaptive modulation and coding method according to claim 3, wherein the first user equipment is coordinated multipoint (CoMP) user equipment but not multi-user multiple-input multiple-output (MU-MIMO) user equipment; or the first user equipment is MU-MIMO user equipment but not CoMP user equipment; or the first user equipment is both CoMP user equipment and MU-MIMO user equipment; or the first user equipment is neither CoMP user equipment nor MU-MIMO user equipment.

6. The adaptive modulation and coding method according to claim 1, wherein when the first user equipment needs to perform downlink data transmission, the acquiring a SINR predictor of the first user equipment according to the scheduling information of the first user equipment in the first cell and the scheduling information of the second user equipment in the second cell comprises:

if a resource block used by the second cell is the same as a resource block used by the first cell, acquiring, on the resource block, measurement information from the first cell to the first user equipment and interference prediction information of the first user equipment, wherein the first cell is a cell in which a base station sends information to the first user equipment; and calculating the SINR predictor according to the measurement information from the first cell to the first user equipment and the interference prediction information of the first user equipment.

7. The adaptive modulation and coding method according to claim 6, wherein the calculating the SINR predictor according to the measurement information from the first cell to the first user equipment and the interference prediction information of the first user equipment comprises:

correcting a historical SINR measurement value of the first user equipment according to channel information from the first cell to the first user equipment, transmit power that is of the first cell and is for the first user equipment, a channel quality indicator reported by the first user equipment, channel information from the second cell to the first user equipment, transmit power of the second cell on the resource block, and an estimation on interference noise of a cell other than the first cell and the second cell against the first user equipment, so as to calculate the SINR predictor, wherein the channel information comprises reference signal received power and/or reference signal received quality.

8. A base station, comprising:

a memory, configured to store program code; and a processor, configured to invoke the program code stored in the memory to acquire scheduling information of first user equipment in a first cell, wherein the scheduling information comprises a resource block and transmit power that are allocated to the first user equipment;

wherein the processor is further configured to acquire scheduling information of second user equipment in a second cell, wherein the scheduling information comprises a resource block and transmit power that are allocated to the second user equipment;

wherein the processor is further configured to acquire a signal to interference plus noise ratio (SINR) predictor of the first user equipment according to the scheduling information of the first user equipment in the first cell and the scheduling information of the second user equipment in the second cell;

wherein the processor is further configured to obtain a SINR adjustment value of the first user equipment according to the SINR predictor and a SINR adjustment amount; and wherein the processor is further configured to determine, according to a correspondence between a SINR and a modulation and coding scheme (MCS), an MCS corresponding to the SINR adjustment value of the first user equipment.

9. The base station according to claim 8, wherein when the first user equipment needs to perform uplink data transmission, the processor is configured to:

if the resource block used by the second user equipment is the same as the resource block used by the first user equipment, acquire, on the resource block, measurement information from the first user equipment to the first cell and interference prediction information of the first user equipment; and calculate the SINR predictor according to the measurement information from the first user equipment to the first cell and the interference prediction information of the first user equipment.

10. The base station according to claim 9, wherein the processor is configured to:

calculate the SINR predictor according to channel information from the first user equipment to the first cell, the transmit power of the first user equipment, channel information from the second user equipment to the first cell, the transmit power of the second user equipment, and an estimation on interference noise of a cell other than the first cell and the second cell against the first user equipment, wherein the channel information comprises a channel response estimation.

11. The base station according to claim 9, wherein the processor is configured to:
correct a historical SINR measurement value of the first user equipment according to channel information from the first user equipment to the first cell, the transmit power of the first user equipment, channel information from the second user equipment to the first cell, the transmit power of the second user equipment, and an estimation on interference noise of a cell other than the first cell and the second cell against the first user equipment, so as to calculate the SINR predictor, wherein the channel information comprises reference signal received power and/or reference signal received quality.

12. The base station according to claim 10, wherein the first user equipment is coordinated multipoint (CoMP) user equipment but not multi-user multiple-input multiple-output (MU-MIMO) user equipment; or
the first user equipment is MU-MIMO user equipment but not CoMP user equipment; or
the first user equipment is both CoMP user equipment and MU-MIMO user equipment; or
the first user equipment is neither CoMP user equipment nor MU-MIMO user equipment.

13. The base station according to claim 8, wherein when the first user equipment needs to perform downlink data transmission, the processor is configured to:
if a resource block used by the second cell is the same as a resource block used by the first cell, acquire, on the resource block, measurement information from the first cell to the first user equipment and interference prediction information of the first user equipment, wherein the first cell is a cell in which the base station sends information to the first user equipment; and
calculate the SINR predictor according to the measurement information from the first cell to the first user equipment and the interference prediction information of the first user equipment.

14. The base station according to claim 13, wherein the processor is configured to:
correct a historical SINR measurement value of the first user equipment according to channel information from the first cell to the first user equipment, transmit power that is of the first cell and is for the first user equipment, a channel quality indicator reported by the first user equipment, channel information from the second cell to the first user equipment, transmit power of the second cell on the resource block, and an estimation on interference noise of a cell other than the first cell and the second cell against the first user equipment, so as to calculate the SINR predictor, wherein the channel information comprises reference signal received power and/or reference signal received quality.

* * * * *